United States Patent Office 3,391,184
Patented July 2, 1968

3,391,184
α-METHYLTHIOCINNAMIC ACID
AND DERIVATIVES
Motohiro Nishio, Meguro-ku, Tokyo, Teiichiro Ito, Bunkyo-ku, Tokyo, Tadao Ishii, Fuchu-shi, Tokyo, and Hiroshi Ogawa, Setagaya-ku, Tokyo, Japan, assignors to Meiji Seika Kaisha, Ltd., Chuo-ku, Tokyo, Japan, a corporation of Japan
No Drawing. Filed Aug. 5, 1964, Ser. No. 387,808
Claims priority, application Japan, Aug. 10, 1963, 38/40,925; Apr. 20, 1964, 39/22,013
5 Claims. (Cl. 260—516)

ABSTRACT OF THE DISCLOSURE

The disclosure pertains to substituted aryl and unsubstituted aryl alpha-methylthiocinnamic acids and method for making same by reacting a methyl halide with a substituted or unsubstituted aryl alpha-mercaptocinnamic acid.

---

The present invention relates to new acids useful as an intermediate for medicines and to a process for the production of such new acids.

According to the present invention, there are provided new acids represented by the general formula:

$$\underset{R_2\phantom{xx}R_3}{\text{(aryl)}}-CH=C-COOH$$
$$\phantom{xxxxxxxxxxxxx}|$$
$$\phantom{xxxxxxxxxxxxx}SCH_3 \quad (I)$$

wherein $R_1$ is selected from the group consisting of hydrogen, chlorine, bromine, lower alkyl, lower alkoxy, hydroxy, and carboxy; $R_2$ is selected from the group consisting of hydrogen, chlorine, bromine, hydroxy and $R_2$ taken together with $R_1$ are 3,4-methylenedioxy; and $R_3$ is selected from the group consisting of hydrogen and bromine.

The present invention also provides a process for the production of new acids represented by the general Formula I by reacting a methyl halide $XCH_3$ wherein X is halogen, with compounds represented by the general formula:

$$\text{(aryl)}-CH=C-COOH \longleftrightarrow \text{(aryl)}-CH_2-C-COOH$$
$$\phantom{xxxxxxxx}|\phantom{xxxxxxxxxxxxxxxxxxxxxxxxx}\|$$
$$\phantom{xxxxxxxx}SH\phantom{xxxxxxxxxxxxxxxxxxxxxxxxxxx}S \quad (II)$$

wherein $R_1$, $R_2$ and $R_3$ are the same as are mentioned above.

When the Compounds I of the present invention are condensed, for example, with 6-aminopenicillanic acid, synthetic penicillins effective against penicillin G-fast microorganisms will be obtained.

According to the present invention, the Compound I may be obtained in such a way that the Compound II is caused to react with a methyl halide in an aqueous alkali, for example, caustic soda solution, and the reaction solution is then made acid. The starting Compound II can be obtained, for example, by condensing rhodanine and an aromatic aldehyde having substituent and then decomposing the resulting condensation product with an alkali. The condensation products of rhodanine and aromatic aldehydes are represented by the general formula:

$$\text{(aryl)}-CH=C-CO$$
$$\phantom{xxxxxxxxxxx}|\phantom{xx}\diagdown$$
$$\phantom{xxxxxxxxxxx}S\phantom{xxx}NH$$
$$\phantom{xxxxxxxxxxxxx}\diagdown\phantom{x}\diagup$$
$$\phantom{xxxxxxxxxxxxxxx}C$$
$$\phantom{xxxxxxxxxxxxxxx}\|$$
$$\phantom{xxxxxxxxxxxxxxx}S \quad (III)$$

wherein $R_1$, $R_2$ and $R_3$ are the same as are mentioned above. The Compound I may be obtained also in such a way that the Compound III is decomposed with an alkali and the reaction mixture is then caused to react with methyl halide without isolating the Compound II. By this procedure, there may be obtained the mixture of two geometrical isomers, which are represented by the following formulae:

(trans-isomer)  (cis-isomer)

These two geometrical isomers may be separated from each other by fractional crystallization if desired.

The present invention will be illustrated below in detail by way of examples as follows:

EXAMPLE 1

α-Methylthiocinnamic acid 500 mg. of methyl iodide and 5 ml. of 1 N caustic soda solution were added to 500 mg. of α-mercaptocinnamic acid, structural formula:

$$\text{(aryl)}-CH=C-COOH \longleftrightarrow \text{(aryl)}-CH_2-C-COOH$$
$$\phantom{xxxxxxxx}|\phantom{xxxxxxxxxxxxxxxxxxxxxxxxx}\|$$
$$\phantom{xxxxxxxx}SH\phantom{xxxxxxxxxxxxxxxxxxxxxxxxxxx}S$$

and the mixture was refluxed at 90–100° C. for one hour on a water bath. After cooling, the reaction solution was made acid with hydrochloric acid, whereupon crystals of α-methylthiocinnamic acid, structural formula:

$$\text{(aryl)}-CH=C-COOH$$
$$\phantom{xxxxxxxxxxx}|$$
$$\phantom{xxxxxxxxxxx}SCH_3$$

were deposited. After being filtered, the crystals were recrystallized from a mixture of methanol and water. Yield: 400 mg. M.P. 94–96° C.

Analysis (as $C_{10}H_{10}SO_2$): Calcd.: C, 62.2%; H, 5.2%; S, 16.7%. Found: C, 61.8%; H, 5.2%; S, 16.5%.

EXAMPLE 2

α-Methylthio-o-chlorocinnamic acid

Methyl iodide (1 g.) and 10 ml. of 1 N caustic soda solution were added to 1 g. of α-mercapto-o-chlorocinnamic acid, the structural formula $$\underset{Cl}{\text{(aryl)}}-CH=C-COOH \longleftrightarrow \underset{Cl}{\text{(aryl)}}-CH_2-C-COOH$$
$$\phantom{xxxxxxxx}|\phantom{xxxxxxxxxxxxxxxxxxxxxxxxxxxx}\|$$
$$\phantom{xxxxxxxx}SH\phantom{xxxxxxxxxxxxxxxxxxxxxxxxxxxxxx}S$$

and the mixture was refluxed at 90–100° C. for one hour on a water bath. After cooling, the solution was made acid to give an oily reaction product. Said product was left to stand for a while, whereupon it crystallized. The yield of α-methylthio-o-chlorocinnamic acid, the structural formula

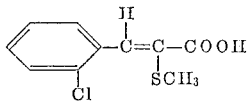

was 750 mg. It was recrystallized from a mixture of methanol and water. M.P. 143°–6° C.

Analysis (as $C_{10}H_9SO_2Cl$): Calcd.: C, 52.5%; H, 4.0%. Found: C, 52.6%; H, 3.8%.

EXAMPLE 3

The following acids were prepared by repeating the same procedure as described in Examples 1 and 2. The M.P. yields and elemental analysis of the resulting products of the general formula

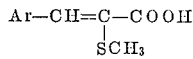

in which Ar represents aryl radical are tabulated below.

(84%). This substance was a mixture of the cis- and trans-acid of the structural formulae:

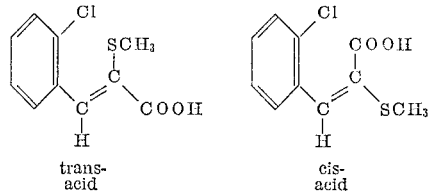

trans-acid     cis-acid

This crystalline mass then was dissolved in methanol and mixed with a small amount of water to render α-methylthio-o-chloro-transcinnamic acid to crystallize. The mother liquor, which was separated from the trans acid, was concentrated under reduced pressure. The residue was recrystallized from acetic acid to give α-methylthio-o-chlorociscinnamic acid. Yield: 1.2 g. The trans-acid, which was recrystallized from ethanol, showed M.P. 146° C., while the cis-acid showed M.P. 109° C. The yield of trans-acid was 4.9 g.

Elemental analysis (as $C_{10}H_9SO_2Cl$): Calcd.: C, 52.52%; H, 3.97%. Found: (trans-acid) C, 52.37%; H, 3.91%; (cis-acid) C, 52.50%; H, 4.03%.

What we claim is:

1. Compound having the following general formula:

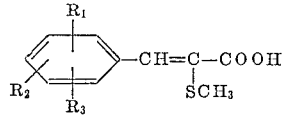

| Ar | M.P. °C. | Yield (Percent) | Elemental analysis | | | | | |
|---|---|---|---|---|---|---|---|---|
| | | | Calcd. | | | Found | | |
| | | | C | H | S | C | H | S |
| p-Methoxy-phenyl | 126–8 | 70 | 58.9 | 5.4 | 14.3 | 58.7 | 4.9 | 13.9 |
| m-Chlorophenyl | 127–8 | 78 | 52.5 | 4.0 | -------- | 52.8 | 4.1 | -------- |
| p-Chlorophenyl | 140–3 | 80 | 52.5 | 4.0 | -------- | 52.7 | 4.0 | -------- |
| p-Methylphenyl | 144 | 90 | 63.5 | 5.8 | 15.4 | 64.2 | 5.8 | 15.3 |
| p-Hydroxyphenyl | 141–2 | 80 | 57.1 | 4.8 | 15.3 | 57.4 | 4.6 | 15.1 |
| 3,4-methylenedioxyphenyl | 167–8 | 94 | 55.5 | 4.2 | 13.5 | 55.9 | 4.5 | 13.7 |
| p-Bromophenyl | 124–5 | 86 | 44.0 | 3.3 | -------- | 43.8 | 3.3 | -------- |
| o-Carboxyphenyl | 97–8 | 83 | 55.5 | 4.2 | 13.5 | 55.6 | 4.2 | 13.3 |
| 2-hydroxy-3-methoxyphenyl | 139–140 | 86 | 55.0 | 5.0 | 13.3 | 55.3 | 4.9 | 12.9 |
| 4-hydroxy-3,5-dibromophenyl | 200–1 | 91 | 32.6 | 2.2 | -------- | 32.9 | 2.0 | -------- |
| 3-ethoxy-4-hydroxyphenyl | 89–90 | 76 | 56.7 | 5.6 | 12.6 | 56.4 | 5.9 | 12.0 |

EXAMPLE 4

α-Methylthio-o-chlorocinnamic acid (cis- and trans-form)

The condensation product of rhodanine with o-chlorobenzaldehyde, i.e., 5 - (o - chlorophenylmethylene)-rhodanine, the structural formula

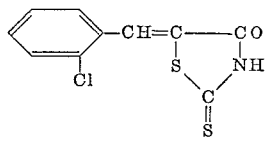

(11 g.) was dissolved in 15% caustic soda solution and was warmed at 85–95° C. for 30 minutes. To this solution, 15 g. of methyl iodide were added in five portions and the mixture was refluxed for 20–30 minutes, and then the excess of methyl iodide was removed under reduced pressure. The resulting solution was poured into a mixture of conc. hydrochloric acid and ice water. The separated oily material became gradually crystalline mass, which was filtered and washed well with water. Yield: 8.2 g.

wherein $R_1$ is selected from the group consisting of hydrogen, chlorine, bromine, lower alkyl, lower alkoxy, hydroxy, and carboxy; $R_2$ is selected from the group consisting of hydrogen, chlorine, bromine, hydroxy and $R_2$ taken together with $R_1$ are 3,4-methylenedioxy; and $R_3$ is selected from the group consisting of hydrogen and bromine.

2. Alpha-methylthio-halo-cinnamic acid wherein the halo radical is selected from the group consisting of chlorine and bromine.

3. α-Methylthiocinnamic acid.
4. α-Methylthio-o-chlorotranscinnamic acid.
5. α-Methylthio-o-chlorociscinnamic acid.

References Cited

UNITED STATES PATENTS 2,863,915  12/1958  Emerson _____ 260—516

OTHER REFERENCES

Reid: Org. Chem. of Bivalent Sulfur, vol. III, pp. 184–185 (1960).

LORRAINE A. WEINBERGER, *Primary Examiner.*

R. K. JACKSON, *Examiner.*

M. G. BERGER, *Assistant Examiner.*